UNITED STATES PATENT OFFICE.

WILLIAM B. NETTLE, OF STEWARD'S MILLS, TEXAS.

INSECTICIDE COMPOUND.

SPECIFICATION forming part of Letters Patent No. 255,883, dated April 4, 1882.

Application filed January 30, 1882. (No specimens.)

*To all whom it may concern:*

Be it known that I, WILLIAM B. NETTLE, of Steward's Mills, in the county of Freestone and State of Texas, have invented certain new and useful Improvements in Insect-Exterminating Compounds and Processes; and I do hereby declare that the following is a full, clear, and exact description of the invention, which will enable others skilled in the art to which it appertains to make and use the same.

This invention relates to a compound for the extermination or destruction of ants and other small insects which burrow in the ground and injure the roots and growth of plants; and it consists of the following ingredients combined in the proportions stated, viz: bisulphide of carbon, ninety-six and three-fourths parts; sulphur, three parts; sulphydric acid, one-fourth part. In compounding these ingredients the bisulphide of carbon is allowed to dissolve the sulphur, and then the acid is added at a temperature of 72° Fahrenheit. The ingredients are then intermingled by agitation or other suitable means, and the whole is explosive when in contact with fire.

In using my insect-exterminating compound the surface of the ground is first cleaned off until a passage leading down or communicating with the main nest of the insects is discovered. A small quantity of water is then poured into this passage, and immediately after a quantity of the compound—say one-half to a whole pint—is poured in. A lighted match is now placed in contact with the liquid, which causes the latter to explode in the ground, the fire and heat of which explosion and the gases generated thereby will effectually destroy the ants or other insects.

My compound does not explode with force enough to materially injure the ground, and will be found especially useful in certain sections where the above-named insects are particularly pestiferous and numerous.

Having thus described my invention, I claim and desire to secure by Letters Patent of the United States—

The herein-described insecticide compound for the extermination of insects, consisting of bisulphide of carbon, sulphur, and sulphydric acid, in about the proportions specified.

In testimony that I claim the foregoing as my own I have hereto affixed my signature in presence of two witnesses.

WILLIAM B. NETTLE.

Witnesses:
A. G. ANDERSON,
W. F. WEBB.